_United States Patent Office_

3,113,957
Patented Dec. 10, 1963

3,113,957
METHOD OF PREPARATION OF PHOSPHOROMONOTHIOIC ACID DIESTERS
David E. Ailman, Pennington, N.J., assignor to American Cyanamid Company, New York, N.Y., a corporation of Maine
No Drawing. Filed Mar. 1, 1962, Ser. No. 176,770
10 Claims. (Cl. 260—461)

The present invention relates to a process for preparing phosphoromonothioic acids. More particularly, it relates to the preparation of either O,O-dialkylphosphoromonothioic acids or O,O-diarylphosphoromonothioic acids from the corresponding O,O-dialkylphosphorodithioic acids or O,O-diarylphosphorodithioic acids in good yield and purity.

It has been unexpectedly discovered that O,O-dialkylphosphoromonothioic acids or O,O-diarylphosphoromonothioic acids can be prepared in a direct, straightforward manner by reacting a substantially anhydrous alcohol with a phosphorodithioic acid. The corresponding monothioic acid is surprisingly obtained in good yield and purity. The over-all reaction may be graphically written as:

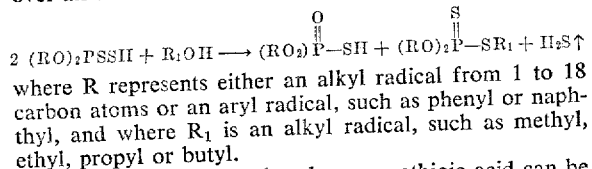

where R represents either an alkyl radical from 1 to 18 carbon atoms or an aryl radical, such as phenyl or naphthyl, and where $R_1$ is an alkyl radical, such as methyl, ethyl, propyl or butyl.

Advantageously, the phosphoromonothioic acid can be readily recovered from the aforementioned reaction mixture containing both the phosphoromonothioic acid and the S-alkyl ester of the phosphorodithioic acid. For instance, one method for recovery of the acid is readily accomplished by the neutralization of the phosphoromonothioic acid in an aqueous alkaline medium and, finally, separating the so-neutralized monothioic acid salt from the organic layer containing the ester of the dithioic acid. Another method employed for acid recovery is the removal of the dithioic acid ester by fractional distillation at reduced pressures whereby the free monothioic acid is obtained directly as a residue from such distillation. This latter procedure is preferred because the acid is obtained absent neutralization.

Phosphoromonothioic acids find utility in the preparation of phosphoromonothioate insecticidal compositions.

According to the process of the present invention, either an O,O-dialkylphosphorodithioic acid or an O,O-diarylphosphorodithioic acid is reacted with an anhydrous alcohol for a time sufficient to eliminate hydrogen sulfide produced as a result of the reaction. Usually, from eight to about twenty-four hours are required for the reaction to be completed.

Illustrative phosphorodithioic acids employed in the process of the present invention are, for instance:

O,O-dimethyl phosphorodithioic acid,
O,O-diethyl phosphorodithioic acid,
O,O-di(n-propyl) phosphorodithioic acid,
O,O-di(isopropyl) phosphorodithioic acid,
O,O-di-t-butyl phosphorodithioic acid,
O,O-dipentyl phosphorodithioic acid,
O,O-di-sec-hexyl phosphorodithioic acid,
O,O-diphenyl phosphorodithioic acid,
O,O-ditolyl phosphorodithioic acid, and
O,O-di-xylyl phosphorodithioic acid.

It has been found that the esterifying alcohol will react with each of the aforementioned phosphorodithioic acids and will cause a substantial portion of each of the acids to be converted to the corresponding phosphoromonothioic acid. However, to achieve this effect, the alcohol must be substantially anhydrous. Dilution of the alcohol with water produces "hydrolysis" which has a deleterious effect on the yield and purity of the resultant phosphoromonothioic acid.

Typical alcohols employed are: methanol, ethanol and propanol. Although one mol of alcohol reactant and two mols of the phosphorodithioic acid are usually provided, an excess of alcohol up to about 30 mols or more can be advantageously employed.

The reaction temperature may be widely varied. Thus, for instance, temperatures between about 25° C. and 125° C. are employed. For optimum results with respect to yields, however, temperatures between 50° C. and 100° C. are preferred.

In order to facilitate a further understanding of the invention, the following examples are presented primarily for the purpose of illustrating certain more specific details thereof. The scope of the invention is not to be deemed limited thereby except as defined in the claims. Unless otherwise stated, the parts are by weight.

*Example 1*

O,O-diethyl phosphorodithioic acid (97.5 parts) is added to anhydrous ethyl alcohol (138.4 parts in a suitable reaction vessel and the mixture is refluxed for approximately sixteen hours while maintaining the temperature between about 75° C. and 85° C. When the evolution of hydrogen sulfide ceases, the reaction mixture is neutralized with aqueous potassium hydroxide and is concentrated by distillation at a reduced pressure of about 10 mm. Hg. Separation between an aqueous layer and an organic layer occurs upon addition of ether, whereby the removal of oily by-product in the ether is readily effected. The desired phosphoromonothioic acid salt remains in the aqueous layer. Separation of the layer and evaporation of the same to dryness leaves 57 parts of solid which, on fractional crystallization from acetone, yields 38 parts of potassium O,O-diethylphosphoromonothioate having a melting point between 197° C. and 201° C. and corresponding to a yield of 36% based upon the O,O-diethylphosphorodithioic acid converted. The free acid, O,O-diethyl phosphoromonothioic acid, is obtained upon neutralization with hydrochloric acid.

*Example 2*

Repeating Example 1 in every detail except that the O,O-dimethyl phosphorodithioic acid is substituted for the O,O-diethyl phosphorodithioic acid, O,O-dimethyl phosphoromonothioic acid, as its potassium salt, is obtained in good yield and purity.

*Example 3*

Substituting O,O-diphenyl phosphorodithioic acid for the the O,O-diethyl phosphorodithioic acid of Example 1 and repeating the procedure stated therein in every detail, the corresponding O,O-diphenyl phosphoromonothioic acid as its potassium salt is recovered.

*Example 4*

Example 1 is repeated in every detail except that the recovery step involving the O,O-diethyl phosphoromonothioic acid in admixture with the S-ethyl ester of the phosphorodithioic acid is carried out as follows: The free monothioic acid is obtained without neutralization by a process of extraction of the neutral dithio ester with petroleum ether in which the monothioic acid is sparingly soluble. The free monothioic acid is obtained as a lower layer in a substantially pure form.

*Example 5*

Example 1 is repeated in every detail, except that the free monothioic acid is recovered without neutralization by distillation at a temperature of about 100° C. under reduced pressure to remove the solvent at about 100 mm. Hg. After removal of the dithioic ester by lowering the pressure to about 0.1 mm. to 5 mm. Hg, resultant free monothioic acid of good purity and yield is obtained.

Example 6

A mixture of 80 parts of methyl alcohol and 80 parts of O,O-dimethyl phosphorodithioic acid is heated to 65° C.–70° C. for eight hours until hydrogen sulfide is no longer evolved. The mixture contains 29 parts of O,O-dimethyl phosphoromonothioic acid and the corresponding O,O-dimethyl-S-methyl phosphorodithioic acid ester.

Example 7

A mixture containing 64 parts of O,O-diethyl phosphorodithioic acid and 160 parts of methyl alcohol is heated at between 52° C. and 66° C. for four hours. Resultant O,O-diethyl phosphoromonothioic acid is neutralized with about 90 parts of 1 N sodium hydroxide diluted with 250 parts of water. The organic phase containing the S-methyl ester of O,O-diethyl phosphorodithioic acid is removed and the aqueous layer evaporated giving 12.5 parts of the sodium salt of the aforementioned phosphoromonothioic acid.

Although several examples above illustrate the preparation of a specific alkali metal salt of a phosphoromonothioic acid, conversion to the free acid by acidification with any suitable acid, such as for example sulfuric acid or hydrochloric acid, is readily achieved.

I claim:

1. An improved process for preparing a phosphoromonothioic acid which consists essentially in the steps of: reacting about two mols of a phosphorodithioic acid characterized by the formula:

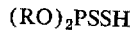

wherein R is a substituent selected from the class consisting of alkyl phenyl, naphthyl and lower alkyl-substituted phenyl radicals, with at least one mol of a substantially anhydrous alcohol selected from the class consisting of methanol, ethanol and propanol, for a time sufficient to eliminate hydrogen sulfide gas, and thereafter recovering resultant phosphoromonothioic acid characterized by the general formula:

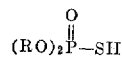

wherein R is defined as above.

2. A process according to claim 1, in which the phosphorodithioic acid is O,O-dimethyl phosphorodithioic acid.

3. A process according to claim 1, in which the phosphorodithioic acid is O,O-diethyl phosphorodithioic acid.

4. A process according to claim 1, in which the phosphorodithioic acid is O,O-diphenyl phosphorodithioic acid.

5. A process according to claim 1, wherein the reaction is carried out in the temperature range of from 50° C. to 100° C.

6. An improved process for preparing a phosphoromonothioic acid which consists essentially in the steps of: reacting about two mols of a phosphorodithioic acid characterized by the formula:

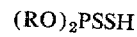

wherein R is a substituent selected from the class consisting of alkyl phenyl, naphthyl and lower alkyl-substituted phenyl radicals, with at least one mol of a substantially anhydrous alcohol selected from the class consisting of methanol, ethanol and propanol, for a time sufficient to eliminate hydrogen sulfide gas, vacuum distilling the resultant mixture consisting essentially of the corresponding phosphoromonothioic acid and the phosphorodithioic ester whereby the latter is initially distilled, and thereafter recovering in good yield and purity remaining phosphoromonothioic acid of the formula:

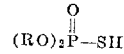

where R is as defined above.

7. A process according to claim 6, in which the phosphorodithioic acid is O,O-dimethyl phosphorodithioic acid.

8. A process according to claim 6, in which the phosphorodithioic acid is O,O-diethyl phosphorodithioic acid.

9. A process according to claim 6, in which the phosphorodithioic acid is O,O-diphenyl phosphorodithioic acid.

10. A process according to claim 6, wherein the reaction is carried in the temperature range of from 50° C. to 100° C.

References Cited in the file of this patent

UNITED STATES PATENTS

| | | |
|---|---|---|
| 2,713,018 | Johnson | July 12, 1955 |
| 3,005,006 | Millikan et al. | Oct. 17, 1961 |

UNITED STATES PATENT OFFICE
CERTIFICATE OF CORRECTION

Patent No. 3,113,957                        December 10, 1963

David E. Ailman

It is hereby certified that error appears in the above numbered patent requiring correction and that the said Letters Patent should read as corrected below.

Column 1, line 26, for that portion of the compound reading "$(RO_2)$" read -- $(RO)_2$ --; column 2, line 24, after "parts" insert a closing parenthesis.

Signed and sealed this 28th day of April 1964.

(SEAL)
Attest:

ERNEST W. SWIDER                          EDWARD J. BRENNER

Attesting Officer                             Commissioner of Patents